United States Patent
Sodagar (10) Patent No.: US 11,570,509 B2
(45) Date of Patent: Jan. 31, 2023

(54) SESSION-BASED INFORMATION FOR DYNAMIC ADAPTIVE STREAMING OVER HTTP

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 98 days.

(21) Appl. No.: 17/076,935

(22) Filed: Oct. 22, 2020

(65) Prior Publication Data

US 2021/0211762 A1 Jul. 8, 2021

Related U.S. Application Data

(60) Provisional application No. 62/957,671, filed on Jan. 6, 2020.

(51) Int. Cl.
*H04N 21/435* (2011.01)
*H04N 21/84* (2011.01)
*H04N 21/845* (2011.01)
*H04N 21/643* (2011.01)

(52) U.S. Cl.
CPC ......... *H04N 21/435* (2013.01); *H04N 21/643* (2013.01); *H04N 21/84* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 2016/0205158 A1* | 7/2016 | Lo | H04L 1/0045 709/219 |
| 2016/0261665 A1* | 9/2016 | Stockhammer | H04L 65/604 |
| 2017/0104803 A1 | 4/2017 | Giladi et al. | |
| 2019/0297128 A1 | 9/2019 | Kitahara et al. | |
| 2019/0342862 A1 | 11/2019 | Kitazato et al. | |

OTHER PUBLICATIONS

International Search Report dated Apr. 14, 2021 in Application No. PCT/US2021/012061. (2 pages).
Philsandberg., "Enhancements for DASH," Content-Technology, Feb. 1, 2021, URL: <http://www.content-technology.com/standards/?p=1210> (1 page).
Information technology—Dynamic adaptive streaming over HTTP (DASH)—Part 8: Session-based DASH operations, WD 23009-8, Jan. 2, 2020 (18 pages).

* cited by examiner

*Primary Examiner* — James R Marandi
(74) *Attorney, Agent, or Firm* — ArentFox Schiff LLP (57) ABSTRACT

Aspects of the disclosure provide methods, apparatuses, and non-transitory computer-readable mediums for receiving media data of media content. One apparatus includes processing circuitry that receives a media presentation description (MPD) file and a session-based description (SBD) file. The processing circuitry determines whether the SBD file includes a starting time attribute indicating a starting time of an SBD timeline of a session. The processing circuitry determines the starting time of the SBD timeline based on the SBD file in response to the SBD file including the starting time attribute. The processing circuitry determines the starting time of the SBD timeline based on the MPD file in response to the SBD file not including the starting time attribute.

17 Claims, 8 Drawing Sheets

SESSION-BASED INFORMATION FOR DYNAMIC ADAPTIVE STREAMING OVER HTTP

INCORPORATION BY REFERENCE

This present application claims the benefit of priority to U.S. Provisional Application No. 62/957,671, "EXTENSIONS AND IMPROVEMENTS TO SESSION-BASED DASH OPERATIONS" filed on Jan. 6, 2020, which is incorporated by reference herein in its entirety.

TECHNICAL FIELD

The present disclosure describes embodiments generally related to session-based information for dynamic adaptive streaming over hypertext transfer protocol (DASH).

BACKGROUND

The background description provided herein is for the purpose of generally presenting the context of the disclosure. Work of the presently named inventor, to the extent the work is described in this background section, as well as aspects of the description that may not otherwise qualify as prior art at the time of filing, are neither expressly nor impliedly admitted as prior art against the present disclosure.

Moving picture experts group (MPEG) has started a new part in dynamic adaptive streaming over hypertext transfer protocol (DASH) standardization for session-based DASH operations. While a media presentation description (MPD) file is generic for all clients, a client may acquire a side file, such as a session-based description (SBD) file, which provides instructions for the client to make the MPD specific for the session. However, in the current design, some SBD specific information is still carried in the MPD file. In addition, the SBD is specifically designed per an application (e.g., using forensic watermarking) and may not be general enough to address other applications.

SUMMARY

Aspects of the disclosure provide apparatuses for receiving media data of media content. One apparatus includes processing circuitry that receives a media presentation description (MPD) file and a session-based description (SBD) file. The processing circuitry determines whether the SBD file includes a starting time attribute indicating a starting time of an SBD timeline of a session. The processing circuitry determines the starting time of the SBD timeline based on the SBD file in response to the SBD file including the starting time attribute. The processing circuitry determines the starting time of the SBD timeline based on the MPD file in response to the SBD file not including the starting time attribute.

In an embodiment, the starting time of the SBD timeline is determined based on a type of the MPD file and an element of the MPD file in which the SBD descriptor is included in response to the SBD file not including the starting time attribute. The SBD descriptor corresponds to the SBD file.

In an embodiment, the starting time of the SBD timeline is determined as a value of an availability starting time attribute of an MPD element in response to the type of the MPD file being dynamic and the SBD descriptor of the MPD file being included in the MPD element.

In an embodiment, the starting time of the SBD timeline is determined as an initial starting time of a media timeline of the media content in response to the type of the MPD file being static and the SBD descriptor of the MPD file being included in the MPD element.

In an embodiment, the starting time of the SBD timeline is determined as a value of a starting time attribute of a period element in response to the SBD descriptor of the MPD file being included in the period element.

In an embodiment, the SBD file includes a duration attribute indicating a duration of the SBD timeline.

In an embodiment, the SBD file includes a loop attribute that indicates whether the SBD timeline is repeated.

In an embodiment, an orderline element of the SBD file includes an attribute indicating a starting segment from which the orderline element is applied.

In an embodiment, timing information of the starting segment is based on the starting time of the SBD timeline.

Aspects of the disclosure provide methods for receiving media data of media content. In one method, a media presentation description (MPD) file and a session-based description (SBD) file are received. Whether the SBD file includes a starting time attribute indicating a starting time of an SBD timeline of a session is determined. The starting time of the SBD timeline is determined based on the SBD file in response to the SBD file including the starting time attribute. The starting time of the SBD timeline is determined based on the MPD file in response to the SBD file not including the starting time attribute.

Aspects of the disclosure also provide non-transitory computer-readable mediums storing instructions which when executed by a computer for retrieving media data for media content the computer to perform any one or a combination of the methods for receiving media data for the session.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Dynamic Adaptive Streaming Over Hypertext Transfer Protocol (DASH) and Media Presentation Description (MPD)

Dynamic adaptive streaming over hypertext transfer protocol (DASH) is an adaptive bitrate streaming technique that enables streaming of media content using hypertext transfer protocol (HTTP) infrastructures, such as web servers, content delivery networks (CDNs), various proxies and caches, and the like. DASH supports both on-demand and live streaming from a DASH server to a DASH client, and allows the DASH client to control a streaming session, so that the DASH server does not need to cope with an additional load of stream adaptation management in large scale deployments. DASH also allows the DASH client a choice of streaming from various DASH servers, and therefore achieving further load-balancing of the network for the benefit of the DASH client. DASH provides dynamic switching between different media tracks, for example, by varying bit-rates to adapt to network conditions.

In DASH, a media presentation description (MPD) file provides information for the DASH client to adaptively stream media content by downloading media segments from the DASH server. The MPD file can be fragmented and delivered in parts to reduce session start-up delay. The MPD file can be also updated during the streaming session. In some examples, the MPD file supports expression of content accessibility features, ratings, and camera views. DASH also supports delivering of multi-view and scalable coded content.

The MPD file can contain a sequence of one or more periods. Each of the one or more periods can be defined by a period element in the MPD file. The MPD file can include an availableStartTime attribute for the MPD and a start attribute for each period. For media presentations with a dynamic type (e.g., used for live services), a sum of the start attribute of the period and the MPD attribute availableStartTime and the duration of the media segment can indicate the availability time of the period in coordinated universal time (UTC) format, in particular the first media segment of each representation in the corresponding period. For media presentations with a static type (e.g., used for on-demand services), the start attribute of the first period can be 0. For any other period, the start attribute can specify a time offset between the start time of the corresponding period relative to the start time of the first period. Each period can extend until the start of the next period, or until the end of the media presentation in the case of the last period. Period start times can be precise and reflect the actual timing resulting from playing the media of all prior periods.

Each period can contain one or more adaptations sets, and each of the adaptation sets can contain one or more representations for the same media content. A representation can be one of a number of alternative encoded versions of audio or video data. The representations can differ by encoding types, e.g., by bitrate, resolution, and/or codec for video data and bitrate, and/or codec for audio data. The term representation can be used to refer to a section of encoded audio or video data corresponding to a particular period of the multimedia content and encoded in a particular way.

Adaptation sets of a particular period can be assigned to a group indicated by a group attribute in the MPD file. Adaptation sets in the same group are generally considered alternatives to each other. For example, each adaptation set of video data for a particular period can be assigned to the same group, such that any adaptation set can be selected for decoding to display video data of the multimedia content for the corresponding period. The media content within one period can be represented by either one adaptation set from group 0, if present, or the combination of at most one adaptation set from each non-zero group, in some examples. Timing data for each representation of a period can be expressed relative to the start time of the period.

A representation can include one or more segments. Each representation can include an initialization segment, or each segment of a representation can be self-initializing. When present, the initialization segment can contain initialization information for accessing the representation. In some cases, the initialization segment does not contain media data. A segment can be uniquely referenced by an identifier, such as a uniform resource locator (URL), uniform resource name (URN), or uniform resource identifier (URI). The MPD file can provide the identifiers for each segment. In some examples, the MPD file can also provide byte ranges in the form of a range attribute, which can correspond to the data for a segment within a file accessible by the URL, URN, or URI.

Each representation can also include one or more media components, where each media component can correspond to an encoded version of one individual media type, such as audio, video, or timed text (e.g., for closed captioning). Media components can be time-continuous across boundaries of consecutive media segments within one representation.

In some embodiments, the DASH client can access and download the MPD file from the DASH server. That is, the DASH client can retrieve the MPD file for use in initiating a live session. Based on the MPD file, and for each selected representation, the DASH client can make several decisions, including determining what is the latest segment that is available on the server, determining the segment availability start time of the next segment and possibly future segments, determining when to start playout of the segment and from which timeline in the segment, and determining when to get/fetch a new MPD file. Once the service is played out, the client can keep track of drift between the live service and its own playout, which needs to be detected and compensated.

II. Session-based DASH Operation and Session-based Description (SBD)

It is noted that the MPD file can be generic for all DASH clients. In order to make the MPD file specific for a session of the DASH client, Moving Picture Expert Group (MPEG) provides session-based DASH operations. In session-based DASH operations, the DASH client can receive a side file, such as a session-based description (SBD) file, which provides instructions for the DASH client to customize the MPD file per a session and possibly per a client.

Figure 1:
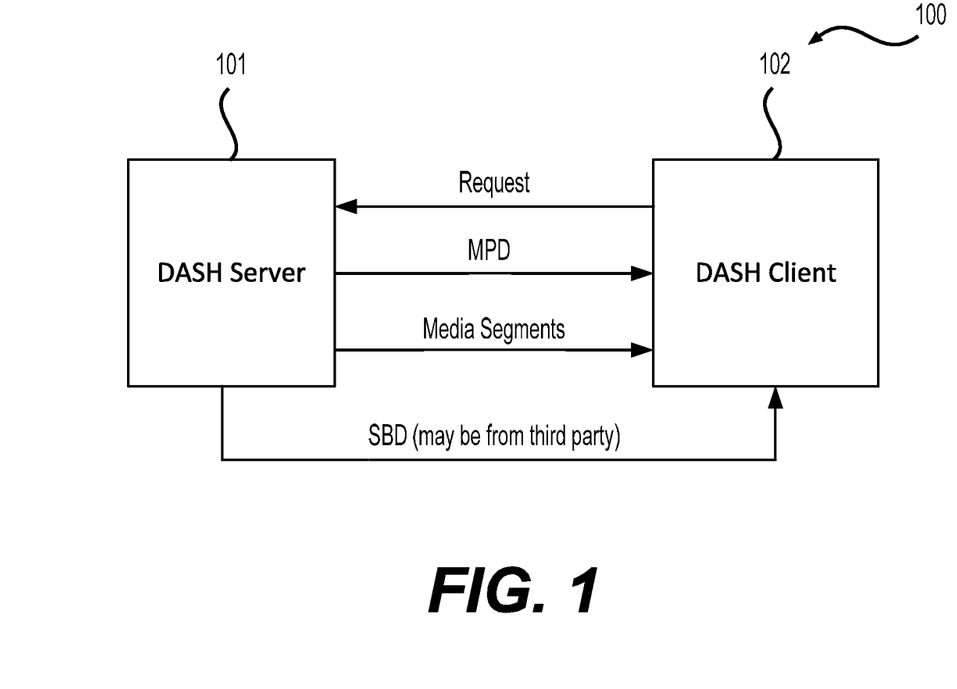
FIG. 1 shows an exemplary session-based dynamic adaptive streaming over hypertext transfer protocol (DASH) system according to an embodiment of the disclosure.

FIG. 1 shows an exemplary session-based DASH system (100) according to an embodiment of the disclosure. In the session-based DASH system (100), an MPD file is sent from a DASH server (101) (e.g., a content server) to a DASH client (102). The DASH client (102) can receive media segments from the DASH server (101) based on the MPD file. The DASH client (102) can send a request to the DASH server (101) for updating the MPD file. In addition, the DASH client (102) can receive an SBD file from the DASH server (101) or a third party (e.g., session controller).

It is noted that multiple DASH servers can send MPD file and media segments, so the MPD file and the media segments can be sent to the DASH client (102) from different DASH servers. In addition, a DASH server receiving the request sent from the DASH client (102) can be different from a DASH server sending the media segments.

According to aspects of the disclosure, the SBD file can include a plurality of time ranges and corresponding key-value pairs (or name-value pairs), along with additional metadata. The SBD file can be referenced in the MPD file by, for example, a URL. The SBD file can be used to customize the MPD file received by the DASH client (102) to be specific for a session of the DASH client (102). For example, the SBD file can allow adding session-specific elements to segment URLs without generating unique per-session MPDs.

Figure 2:
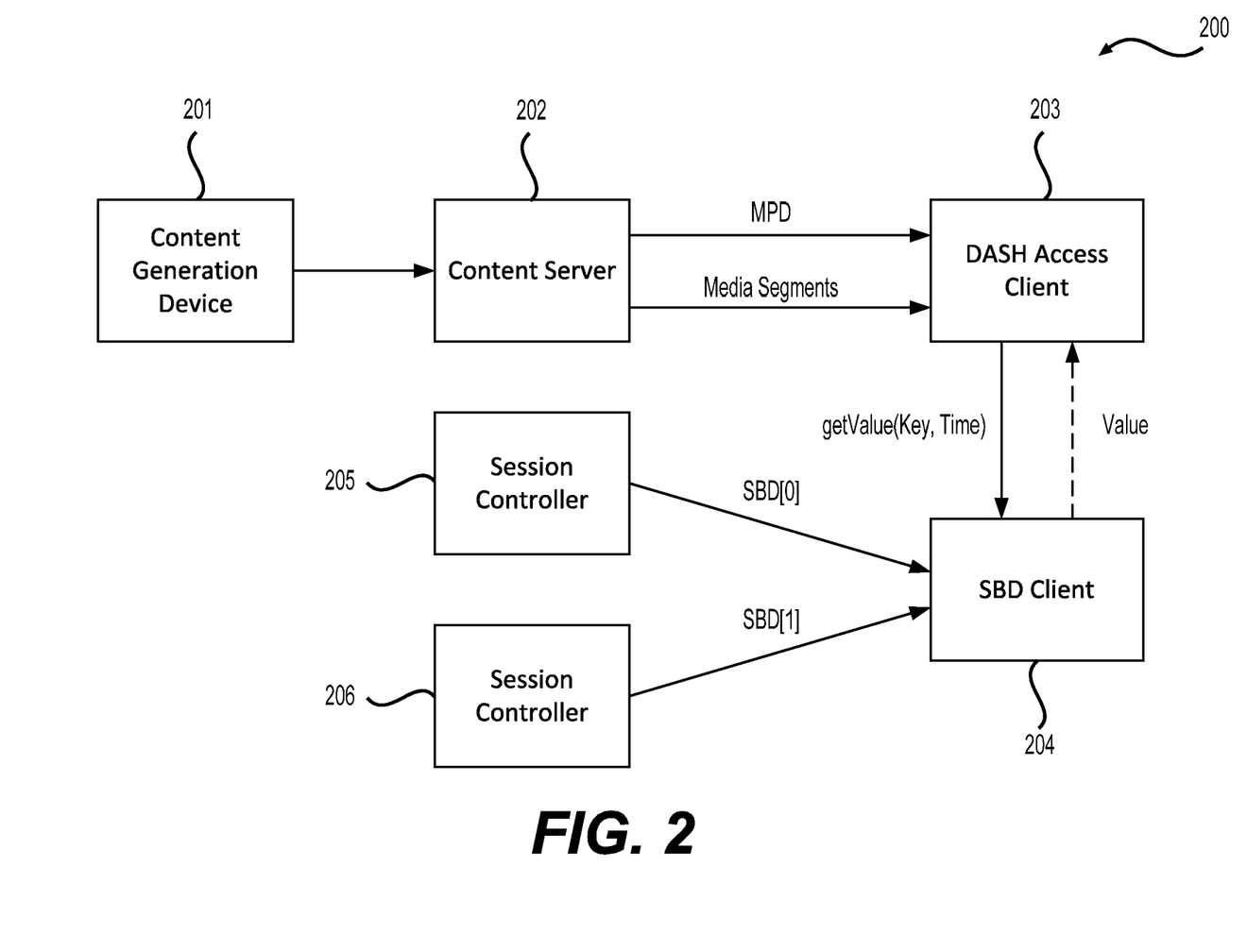
FIG. 2 shows another exemplary session-based DASH system according to an embodiment of the disclosure.

FIG. 2 shows another exemplary session-based DASH system (200) according to an embodiment of the disclosure. In the session-based DASH system (200), multimedia content is prepared and generated by a content generation device (201) (e.g., smartphone) which can include an audio source (e.g., microphone) and a video source (e.g., video camera). The multimedia content can be stored by the content generation device (201) or sent to a content server (202) which can store various multimedia contents. The content server (202) can receive a request from client devices, such as a DASH access client (203), for one or more media segments of the multimedia content. The multimedia content is described by an MPD file, which can be stored and updated by the content server (202) and accessed by the client devices including the DASH access client (203) to retrieve the media segments.

In order to retrieve a session-specific media segment, the DASH access client (203) can send a request to an SBD client (204) (e.g., session client) for accessing an SBD file that is received by the SBD client (204) and includes a plurality of time ranges and corresponding key-value pairs for the current session. For example, the DASH access client (203) can send a key name and a time range to the SBD client (204), which then parses the key name and the time range and returns a value corresponding to the key name and the time range to the DASH access client (203). The DASH access client (203) can include the value in a query of a segment URL which can be sent to the content server (202) for requesting the session-specific media segment when the segment request is a HTTP GET or partial GET request.

It is noted that the SBD client (204) can receive multiple SBD files from different session controllers, such as a session controller (205) and a session controller (206).

According to aspects of the disclosure, any or all of the features of the content server (202) (e.g., DASH server) can be implemented on one or more devices of a content delivery network (CDN), such as routers, bridges, proxy devices, switches, or other devices. The content server (202) can include a request processing unit configured to receive network requests from the client devices (e.g., DASH access client (203)). For example, the request processing unit can be configured to receive HTTP GET or partial GET requests and provide data of multimedia contents in response to the requests. The requests can specify a segment using a URL of the segment. In some examples, the requests can also specify one or more byte ranges of the segment, thus comprising partial GET requests. The request processing unit can further be configured to service HTTP HEAD requests to provide header data of a segment.

In some embodiments, the content generation device (201) and the content server (202) can be coupled by a wireless network or a wired network, or can be directly communicatively coupled.

In some embodiments, the content generation device (201) and the content server (202) can be included in a same device.

In some embodiments, the content server (202) and the session controllers (205)-(206) can be included in a same device.

In some embodiments, the content server (202) and the DASH access client (203) can be coupled by a wireless network or a wired network.

In some embodiments, the SBD client (204) and the session controllers (205)-(206) can be coupled by a wireless network or a wired network, or can be directly communicatively coupled.

In some embodiments, the DASH access client (203) and the SBD client (204) can be included in a same device.

III. DASH Client Architecture

Figure 3:
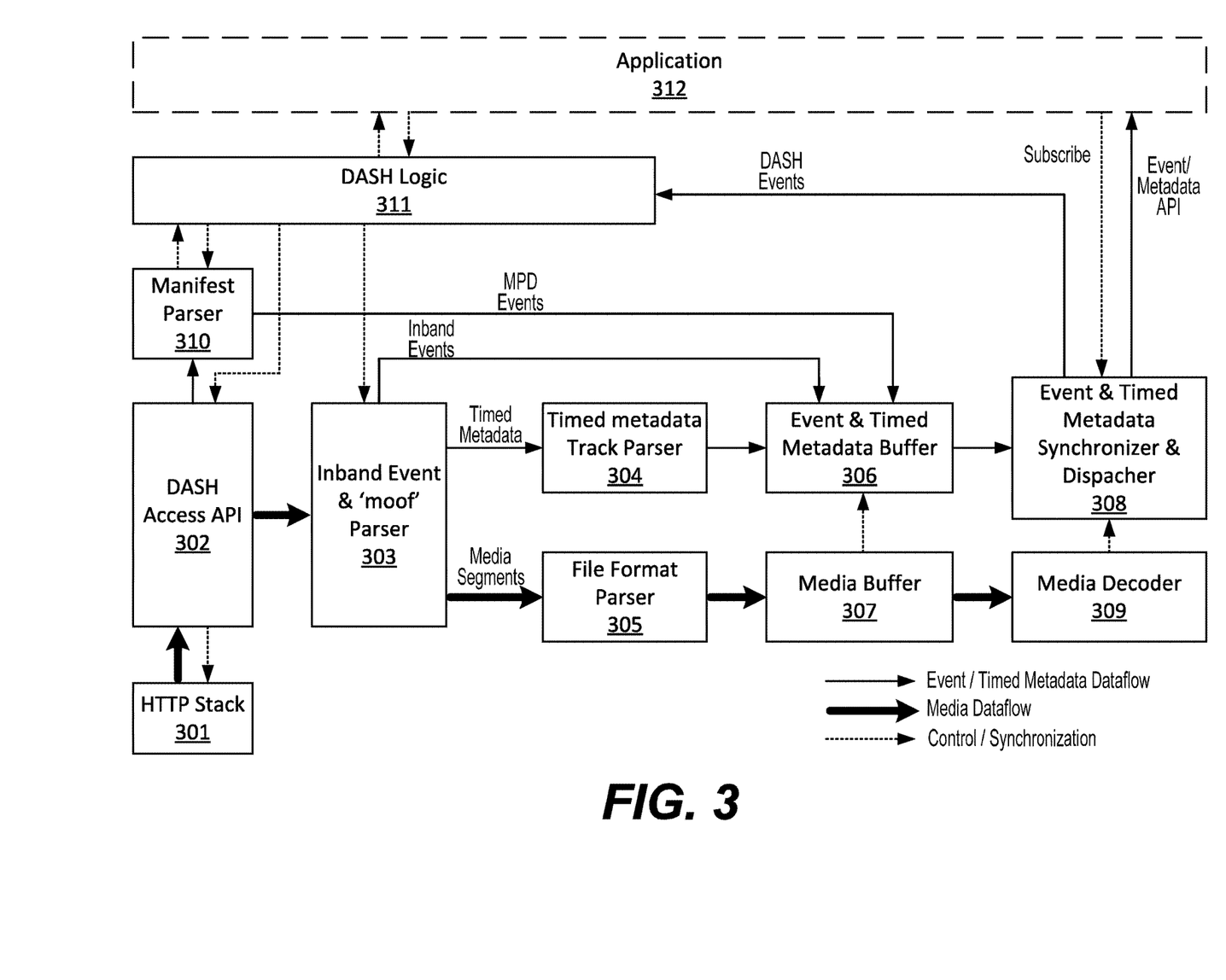
FIG. 3 shows an exemplary DASH client architecture according to an embodiment of the disclosure.

FIG. 3 shows an exemplary DASH client architecture according to an embodiment of the disclosure. A DASH client (or DASH player) such as the DASH client (102) can be configured to communicate with an application (312) and process various types of events, including (i) MPD events, (ii) inband events, and (iii) timed metadata events.

A manifest parser (310) can parse a manifest (e.g., an MPD). The manifest can be provided by the DASH server (101) for example. The manifest parser (310) can extract event information about MPD events, inband events, and timed metadata events embedded in timed metadata tracks. The extracted event information can be provided to a DASH logic (311) (e.g., DASH player control, selection, and heuristic logic). The DASH logic (311) can notify the application (312) of event schemes signaled in the manifest based on the event information.

The event information can include event scheme information for distinguishing between different event streams. The application (312) can use the event scheme information to subscribe to event schemes of interest. The application (312) can further indicate a desired dispatch mode for each of the subscribed schemes through one or more subscription application programming interfaces (APIs). For example, the application (312) can send a subscription request to the DASH client that identifies one or more event schemes of interest and any desired corresponding dispatch modes.

If the application (312) subscribes to one or more event schemes that are delivered as part of one or more timed metadata tracks, an inband event and 'moof' parser (303) can stream the one or more timed metadata tracks to a timed metadata track parser (304). For example, the inband event and 'moof' parser (303) parses a movie fragment box ("moof") and subsequently parses the timed metadata track based on control information from the DASH logic (311).

The timed metadata track parser (304) can extract event messages embedded in the timed metadata track. The extracted event messages can be stored in an event and timed metadata buffer (306). A synchronizer/dispatcher module (308) (e.g., event and timed metadata synchronizer and dispatcher) can dispatch (or send) the subscribed events to the application (312).

MPD events described in the MPD can be parsed by the manifest parser (310) and stored in the event and timed metadata buffer (306). For example, the manifest parser (310) parses each event stream element of the MPD, and parses each event described in each event stream element. For each event signaled in the MPD, event information such as presentation time and event duration can be stored in the event and timed metadata buffer (306) in association with the event.

The inband event and 'moof' parser (303) can parse media segments to extract inband event messages. Any such identified inband events and associated presentation times and durations can be stored in the event and timed metadata buffer (306).

Accordingly, the event and timed metadata buffer (306) can store therein MPD events, inband events, and/or timed metadata events. The event and timed metadata buffer (306) can be a First-In-First-Out (FIFO) buffer, for example. The event and timed metadata buffer (306) can be managed in correspondence with a media buffer (307). For example, as long as a media segment exists in the media buffer (307), any events or timed metadata corresponding to that media segment can be stored in the event and timed metadata buffer (306).

A DASH Access API (302) can manage the fetching and reception of a content stream (or dataflow) including media content and various metadata through an HTTP protocol stack (301). The DASH Access API (302) can separate the received content stream into different dataflows. The dataflow provided to the inband event and 'moof' parser (303) can include media segments, one or more timed metadata tracks, and inband event signaling included in the media segments. In an embodiment, the dataflow provided to the manifest parser (310) can include an MPD.

The DASH Access API (302) can forward the manifest to the manifest parser (310). Beyond describing events, the manifest can also provide information on media segments to the DASH logic (311), which can communicate with the application (312) and the inband event and 'moof' parser (303). The application (312) can be associated with the media content processed by the DASH client. Control/synchronization signals exchanged among the application (312), the DASH logic (311), the manifest parser (310), and the DASH Access API (202) can control the fetching of media segments from the HTTP Stack (301) based on information regarding media segments provided in the manifest.

The inband event and 'moof' parser (303) can parse a media dataflow into media segments including media content, timed metadata in a timed metadata track, and any signaled inband events in the media segments. The media segments including media content can be parsed by a file format parser (305) and stored in the media buffer (307).

The events stored in the event and timed metadata buffer (306) can allow the synchronizer/dispatcher (308) to communicate to the application (312) the available events (or events of interest) related to the application (312) through an event/metadata API. The application (312) can be configured to process the available events (e.g., MPD events, inband events, or timed metadata events) and subscribe to particular events or timed metadata by notifying the synchronizer/dispatcher (308). Any events stored in the event and timed metadata buffer (306) that are not related to the application (312), but are instead related to the DASH client itself can be forwarded by the synchronizer/dispatcher (308) to the DASH logic (311) for further processing.

In response to the application (312) subscribing to particular events, the synchronizer/dispatcher (308) can communicate to the application (312) event instances (or timed metadata samples) corresponding to event schemes to which the application (312) has subscribed. The event instances can be communicated in accordance with a dispatch mode indicated by the subscription request (e.g., for a specific event scheme) or a default dispatch mode. For example, in an on-receive dispatch mode, event instances may be sent to the application (312) upon receipt in the event and timed metadata buffer (306). On the other hand, in an on-start dispatch mode, event instances may be sent to the application (312) at their associated presentation time, for example in synchronization with timing signals from the media decoder (309).

IV. SBD Timing Model

This disclosure presents embodiments and methods for simplifying and enhancing SBD timing models to synchronize an SBD timeline of an SBD file to an MPD timeline of an MPD file. In the simplified and enhanced SBD timing models, a simplified and unified anchor can be used as a starting point of the SBD timeline and an optional duration can be signaled for the SBD timeline. For example, the simplified unified anchor can be used as a starting point for dynamic and static MPDs for MPD and period level SBDs.

Figure 4A:
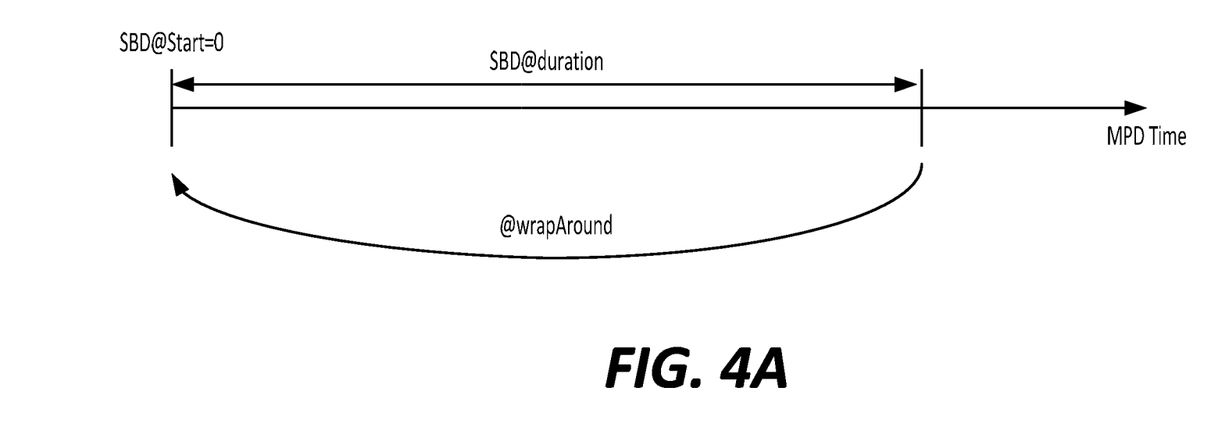
FIGS. 4A and 4B show two exemplary SBD timing models according to embodiments of the disclosure.
Figure 4B:
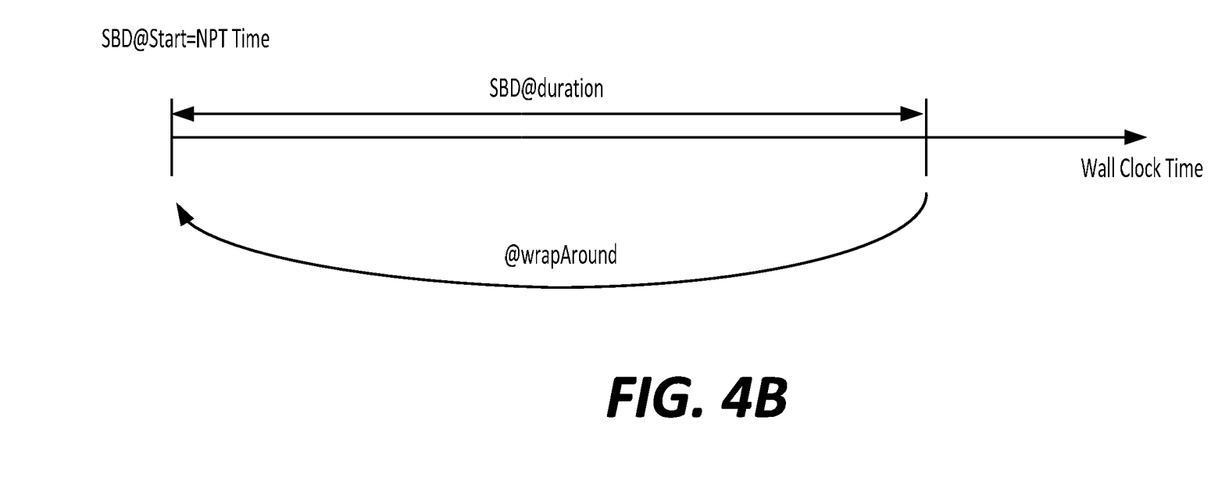

FIGS. 4A and 4B show two exemplary SBD timing models according to embodiments of the disclosure. MPD types can be static (e.g., MPD@type=static) and dynamic (e.g., MPD@type=dynamic) in FIG. 4A and FIG. 4B, respectively. In order to simplify the anchor for the starting point of the SBD timeline, a start parameter such as SBDStart can be introduced. The parameter SBDStart can define the anchor for the starting point of the SBD timeline.

According to aspects of the disclosure, if the MPD type is dynamic, the parameter SBDStart can be explicitly signaled by an SBD starting time attribute (e.g., SBD@startTime) of the SBD file. The SBD starting time attribute can indicate the parameter SBDStart in network time protocol (NTP) time. If the explicit signaling of the SBD starting time attribute is not included in the SBD file, the parameter SBDStart can be derived based on the MPD file. For example, if an SBD descriptor corresponding to the SBD file is included in an MPD element of the MPD file (i.e., the corresponding SBD descriptor is at an MPD level), the parameter SBDStart can be set as a value of an availability starting time attribute of the MPD element (e.g., MPD@availabilityStartTime). However, if the corresponding SBD descriptor is included in a period element of the MPD file (i.e., the corresponding SBD descriptor is at a period level), the parameter SBDStart can be set as a starting time of the period element (e.g., Period@Start).

According to aspects of the disclosure, if the MPD type is static, the parameter SBDStart can be derived based on the MPD file. In an embodiment, if the corresponding SBD descriptor is included in the MPD element of the MPD file, the parameter SBDStart is set as an initial starting time of a media timeline (e.g., '0') of media content. For example, when on-demand media content (e.g., a movie) is streamed to a session of the DASH client (102), the parameter SBDStart is set as an initial starting time of the on-demand media content if an SBD descriptor corresponding to the session is included in an MPD element of an MPD file received by the DASH client (102). However, if the corresponding SBD descriptor is included in a period element of the MPD file, the parameter SBDStart is set as a starting time of the period element (e.g., Period@Start).

In some related examples, a duration of the SBD timeline is defined by a total duration of timeline or orderline elements associated with the SBD timeline. However, in this disclosure, the SBD duration can be optionally signaled in the SBD file, for example, by a duration attribute (e.g., SBD@duration) of the SBD file. In addition, a wrap-around feature can be enabled for the SBD file in this disclosure. The wrap-around feature can enable looping of the SBD timeline that is currently used for a current session of a DASH client such as the DASH client (102). For example, in looping SBDs, if a session timeline of the current session goes beyond the SBD timeline, the SBD timeline can be replicated and looped for the session timeline when the wrap-around feature is enabled. The wrap-around feature can be signaled by a loop attribute (e.g., SBD@loop) of the SBD file.

If the duration of the SBD timeline is signaled in the SBD file, then a time-span of the SBD file can be explicitly indicated. A DASH client such as the DASH client (102) joining a session can derive an anchor and a duration for the SBD timeline using the parameter SBDStart and the duration attribute (e.g., SBD@duration) of the SBD file, respectively, without building an entire SBD time-span. This feature can substantially simplify a client operation of the DASH client to find the SBD time-span for a current playing point of the session. In addition, the SBD timeline may loop in the past. That is, the SBD timeline can be extended to prior to the starting time indicated by the parameter SBDStart. In this case, the parameter SBDStart is one anchor point for the starting time that the SBD can be applied and not an original SBD starting time that corresponds to the starting time of the media content or media session.

Table 1 shows an exemplary key-value pair element in the SBD file according to an embodiment of the disclosure. The table 1 can be implemented in extensible markup language (XML).

TABLE 1

| Element or Attribute Name | Use | Description |
| --- | --- | --- |
| KeyValueTimeline | | Provides information on a single key-value pair in the query string. <br> NOTE: Value may change from (sub)segment to (sub)segment. |
| @keys | M (string) | List of unique key names of key-value properties described in this element. |
| @comment | O (string) | A human-readable comment about the file. |
| @timescale | OD | Timescale in ticks per second for the @d attributes. The default value is 1 (i.e., by default, V@d is in seconds). <br> This value shall be ignored for Orderline addressing. |
| @type | OD | Possible values: "dynamic", "static" <br> Default: "static" <br> Static: the SBD file and its values shall not change during the streaming session. <br> Dynamic: the SBD file and its value may be updated every @ttl seconds. |
| @ttl | CM | the minimum guaranteed duration in seconds that the dynamic SBD is not updated. <br> This attribute shall not be present when @type = static. |
| @startTime | O | Anchor for the starting point of SBD (SBDStart) in NTP time. <br> This attribute shall not be present for MPD@type = 'static'. <br> If absent, SBDStart is obtained as the following: <br> If the SBD descriptor is included in the MPD element, the anchor is '0' and MPD@availabilityStartTime for MPD types 'static' and 'dynamic' respectively. <br> If the SBD descriptor is included in a Period element, the anchor is the Period@Start. |
| @duration | O | The duration that this SBD is applied in seconds. If not present, Timeline or Orderline elements will define the duration. If present, the Timeline or Orderline outside of this duration is ignored. |
| @wrap | OD <br> Default: 'false' | For value 'true', after running out of all Timeline or Orderline elements, the new set of Timeline or Orderline element(s) is added by repeating the same element until the session ends, i.e. all the remaining segment requests of the session shall have query according to this element. <br> For value 'false', if the Timeline or Orderline element(s) ends before the end of the session, no query is added to the remaining segment requests in the session. |
| Timeline | 0 . . . 1 | Values with their time values. |
| V | 1 . . . N | |
| Orderline | 0 . . . 1 | Values with their order values. <br> Either Timeline or Orderline shall be present but not both. |
| O | 1 . . . N | |

Legend:
For attributes: M = Mandatory, O = Optional, OD = Optional with Default Value, CM = Conditionally Mandatory.
XML: elements are bold; attributes are non-bold and preceded with an @. List is a space-separated string (per xml:list)
JSON: objects are bold; name-value pairs are non-bold and preceded with an @. List is an array.

V. Orderline Elements in SBD

According to aspects of the disclosure, an SBD file can include a plurality of key-value pairs (or name-value pairs). One or more of the plurality of key-value pairs can be added to a request sent from a DASH client such as the DASH client (102) to a DASH server such as the DASH server (101). An orderline element of the SBD file can define an order of the key-value pairs. The orderline element can be represented as an O element in the SBD file in some embodiments.

According to aspects of the disclosure, the orderline element can include one of an optional start time attribute (e.g., O@t) and an optional starting segment attribute (e.g., O@f or O@c). The optional start time attribute can indicate a starting time of the orderline element and the optional starting segment attribute can indicate an order number of a starting segment in the orderline element. That is, the optional starting segment attribute can indicate an offset between a first segment and the starting segment. For example, if an order number of the starting segment is f, then the f−1 segment(s) can be skipped for usage. In addition, the orderline element can also include a repeat attribute (e.g., O@r) that indicates a number of repeats for this O element.

Figure 5:
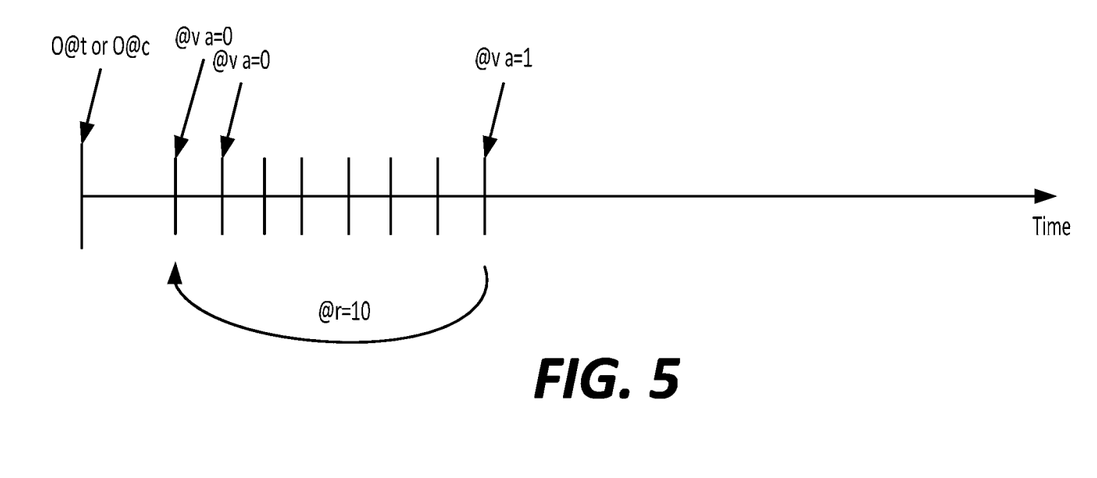
FIG. 5 shows an exemplary orderline element of the SBD file according to an embodiment of the disclosure.

FIG. 5 shows an exemplary orderline element of the SBD file according to an embodiment of the disclosure. In FIG. 5, the orderline element defines an order of key-value pairs to be added to each request. For example, an O element shows the order of the key-value pairs, O@t is an optional starting time of the O element, O@c is an optional starting segment of the O element, O@v includes one or more key-value pairs to be added to each request, and O@r indicates a number of repeats for this O element.

According to aspects of the disclosure, a DASH client such as the DASH client (102) can download an SBD file from a location indicated by an URL of an SBD descriptor in an MPD file, parse the SBD file, and build a timeline/orderline table. Then the DASH client can find a matching row in the timeline/orderline table for requesting a (sub)segment and a corresponding value for each key listed in the SBD descriptor in the matching row, build a query with an order of keys defined in the SBD descriptor, and add the query to the (sub)segment request that can be sent to a DASH server such as the DASH server (101).

In an embodiment, a DASH client such as the DASH access client (203) can receive an MPD file and pass a URL address in the MPD file to an SBD client such as the SBD client (204). The SBD client (204) can download a key-value object from the URL address and build a timeline/orderline table. The DASH client can send a key and a timing or an order of a (sub)segment to the SBD client, which calculates a timing or an order of a requested (sub) segment and finds a row in the timeline/orderline table that matches the timing or the order of the requested (sub) segment. Then the SBD client finds, in the key-value pairs of a matching row, a matching key name that matches the key sent by the DASH client, and returns a value corresponding to the matched key name to the DASH client. The DASH client can add the value (or key=value) to the end of a query of a segment URL used in the (sub)segment request or as a HTTP header extension.

Table 2 shows an exemplary orderline element of the SBD file according to an embodiment of the disclosure. The table 2 can be implemented in XML.

TABLE 2

| Element or Attribute Name | Use | Description |
| --- | --- | --- |
| O |  | Provides information on a single key-value pair in the query string.<br>NOTE: Value may change from (sub)segment to (sub)segment |
| v | CM (list) | String of key-values pair in order matching their names (id's) in KeyValueTimeline@id. Default value: "null".<br>The key and value in each key-value pair are separated by '=' and every two consecutive key-value pairs are separated by '&'.<br>Each value shall contain only unrestricted characters per RFC 3986 Section 2.2. Namely, the permitted characters are uppercase and lowercase letters, decimal digits, hyphen, period, underscore, and tilde. |
| c | O | Starting number of the segment to which the value applies, i.e for c = 5, the first 4 segments are skipped and the fifth segment is the starting segment.<br>The anchor of this time is the SBD Start parameter. SBDStart is obtained as defined in @startTime semantics.<br>If absent, the starting segment is the first segment in corresponding MPD or Period element, depending on which element the SBD descriptor is included.<br>Only one of c or s attributes may be present, but not both. |
| s | O | Start of the time range to which the value applies.<br>The anchor of this time is the SBDStart parameter. SBDStart is obtained as defined in @startTime semantics.<br>Only one of c or s attributes may be present, but not both. |
| n | O | Number of additional segments in this O element using the key-value pairs, e.g. n = 1, two segments are using the key-value pairs of this element.<br>If not present, only one segment in this element is using the key-value pairs defined in this element. |

Legend:
For attributes: M = Mandatory, O = Optional, OD = Optional with Default Value, CM = Conditionally Mandatory.
For elements: <minOccurs> . . . <maxOccurs> (N = unbounded)
XML: elements are bold; attributes are non-bold and preceded with an @. List is a space-separated string (per xml:list)
JSON: objects are bold; name-value pairs are non-bold and preceded with an @. List is an array.

According to aspects of the disclosure, the SBD timing model can include a starting point for the SBD timeline by using the parameter SBDStart, enabling a snap of the SBD timeline to a clear wall-clock time for live content. In addition, if the parameter SBDStart is not signaled explicitly, the SBD timeline can be tied to the MPD timeline using an attribute such as MPD@availabilityStartTime when an SBD descriptor corresponding to the SBD file is included in an MPD element or an attribute such as Period@Start when the corresponding SBD descriptor is included in a period element. Accordingly, a generation of the SBD timeline can be simpler as the MPD and SBD timing models are aligned with their anchor points.

In an embodiment, the SBD timing model can include a duration for the SBD timeline. The duration can allow a simple looping/wrap-around calculation for a DASH client such as the DASH client (102). The duration can indicate an ending of the SBD timeline if the timeline or orderline elements do not span the entire session timeline. Accordingly, when the looping/wrap-around feature is enabled, the timeline or orderline elements can be repeated and looped until the session ends.

In an embodiment, a starting segment attribute (e.g., O@c) is signaled in the orderline element. The starting segment attribute can indicate that any segment prior to the starting segment can be skipped for the session. That is, the starting segment attribute can indicate a segment gap without being aware of the segment durations.

Aspects of the disclosure present a generalized application-independent method for describing session-based DASH operations that allow a synchronization of the SBD timeline to the MPD timeline. The anchor of the SBD timeline can be snapped to the anchor of MPD timeline for both static and dynamic MPD type by using a single attribute. A simple calculation of looping by the DASH client can be possible without expending the SBD detailed timeline (e.g., without calculating a segment duration of each segment). The duration of the SBD timeline can define a boundary for the SBD timeline. The SBD timeline can be associated with an orderline element so that segment gaps and skips can be possible when the orderline element indicates an order number of a starting segment and without knowledge of segment durations. The generalized application-independent method can be implemented in XML.

VI. Flowchart

Figure 6:
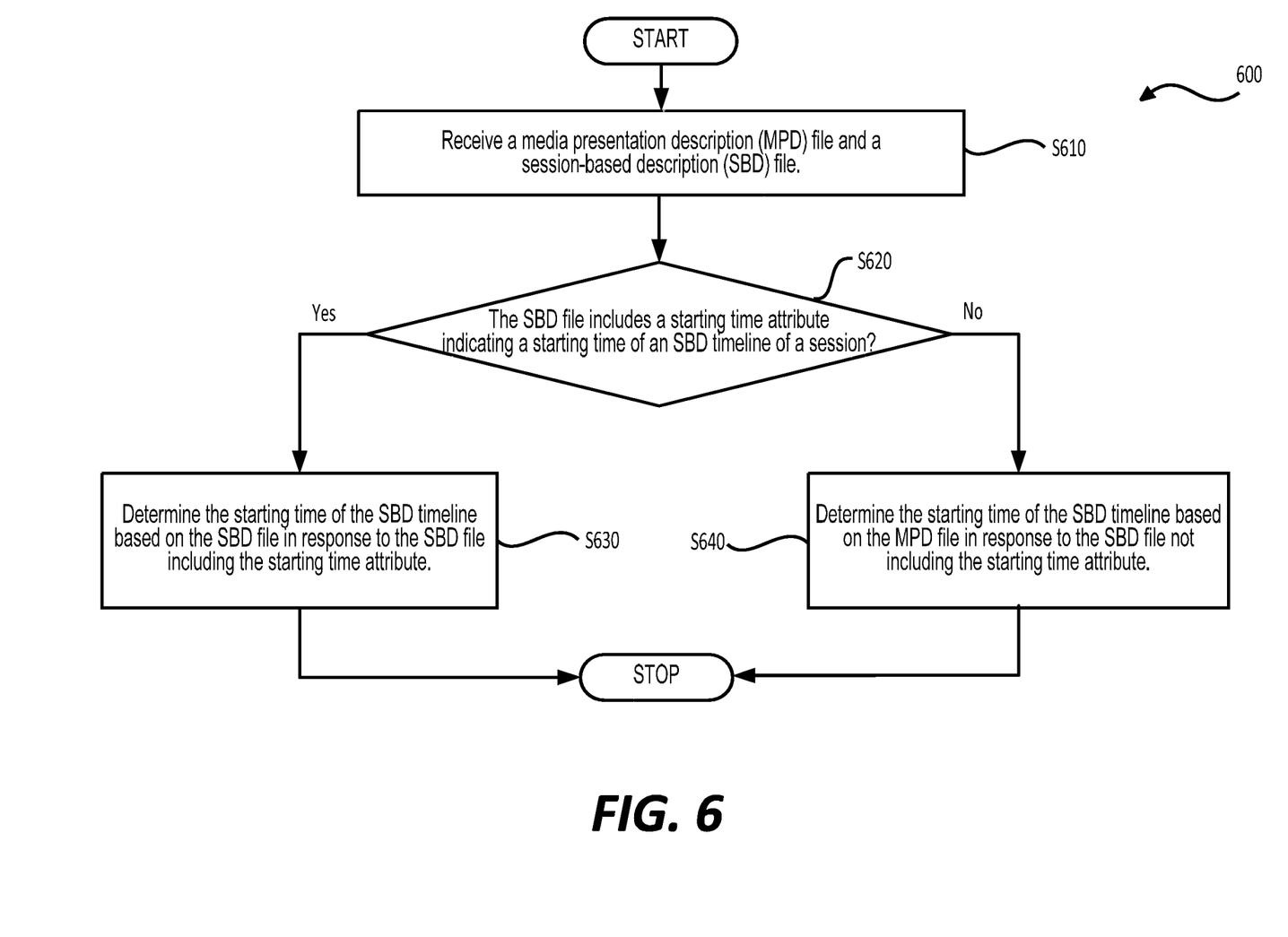
FIG. 6 shows a flow chart outlining a process example according to embodiments of the disclosure.

FIG. 6 shows a flow chart outlining a process (600) according to an embodiment of the disclosure. In various embodiments, the process (600) is executed by processing circuitry, such as the processing circuitry in the DASH client (102), the processing circuitry in the DASH access client (203), the processing circuitry in the SBD client (204), and the like. In some embodiments, the process (600) is implemented in software instructions, thus when the processing circuitry executes the software instructions, the processing circuitry performs the process (600). The process (600) starts at (S610), where the process (600) receives an MPD file and an SBD file. Then, the process (600) proceeds to step (S620).

At step (S620), the process (600) determines whether the SBD file includes a starting time attribute indicating a starting time of an SBD timeline of a session. When the SBD file is determined to include the starting time attribute, the process (600) proceeds to step (S630). Otherwise, the process (600) proceeds to step (S640).

At step (S630), the process (600) determines the starting time of the SBD timeline based on the SBD file.

At step (S640), the process (600) determines the starting time of the SBD timeline based on the MPD file.

Then, the process (600) terminates.

In an embodiment, the starting time of the SBD timeline is determined based on a type of the MPD file and an element of the MPD file in which the SBD descriptor is included in response to the SBD file not including the starting time attribute. The SBD descriptor corresponds to the SBD file.

In an embodiment, the starting time of the SBD timeline is determined as a value of an availability starting time attribute of an MPD element in response to the type of the MPD file being dynamic and the SBD descriptor of the MPD file being included in the MPD element.

In an embodiment, the starting time of the SBD timeline is determined as an initial starting time of a media timeline of the media content in response to the type of the MPD file being static and the SBD descriptor of the MPD file being included in the MPD element.

In an embodiment, the starting time of the SBD timeline is determined as a value of a starting time attribute of a period element in response to the SBD descriptor of the MPD file being included in the period element.

In an embodiment, the SBD file includes a duration attribute indicating a duration of the SBD timeline.

In an embodiment, the SBD file includes a loop attribute that indicates whether the SBD timeline is repeated.

In an embodiment, an orderline element of the SBD file includes an attribute indicating a starting segment from which the orderline element is applied.

In an embodiment, timing information of the starting segment is based on the starting time of the SBD timeline.

Figure 7:
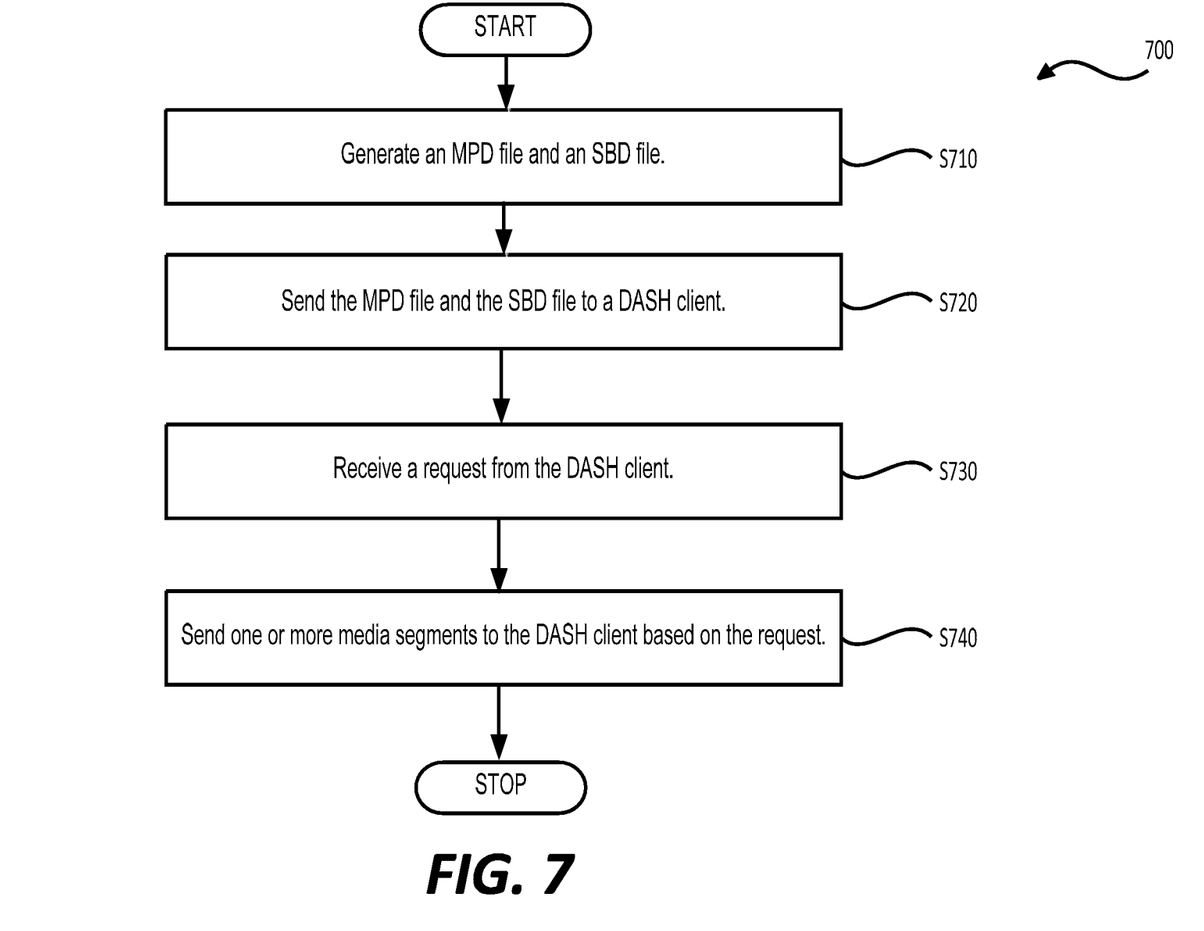
FIG. 7 shows another flow chart outlining a process example according to embodiments of the disclosure.

FIG. 7 shows another flow chart outlining a process (700) according to an embodiment of the disclosure. In various embodiments, the process (700) is executed by processing circuitry, such as the processing circuitry in the DASH server (101), the processing circuitry in the content generation device (201), the processing circuitry in the content server (202), and the like. In some embodiments, the process (700) is implemented in software instructions, thus when the processing circuitry executes the software instructions, the processing circuitry performs the process (700). The process (700) starts at (S710), where the process (700) generates an MPD file and an SBD file.

In an embodiment, when the MPD type of the MPD file is dynamic, the SBD file can include a starting time attribute indicating a starting time of an SBD timeline of a session.

In an embodiment, the starting time of the SBD timeline of the session can be determined based on the MPD file. For example, if an SBD descriptor corresponding to the SBD file is included in an MPD element of the MPD file, an anchor of the starting time of the SBD timeline can be an initial starting time of a media timeline of media content (e.g., '0') and a value of an MPD availability starting time attribute (e.g., MPD@availabilityStartTime) for static MPD and dynamic MPD, respectively. If the corresponding SBD descriptor is included in a period element, the anchor of the starting time of the SBD timeline can be a starting time of the period element.

Then, the process (700) proceeds to step (S720).

At step (S720), the process (700) sends the MPD file and the SBD file to a DASH client such as the DASH client (102). Then, the process (700) proceeds to step (S730).

At step (S730), the process (700) receives a request from the DASH client.

In an embodiment, the DASH client can determine the starting time of the SBD timeline based on at least one of the MPD file and the SBD file. For example, the DASH client can first determine the MPD type of the MPD file. When the MPD type is determined to be static, the DASH client can determine the starting time of the SBD timeline based on the SBD descriptor corresponding to the SBD file. If the corresponding SBD descriptor is included in the MPD element, the starting time of the SBD timeline can be the initial starting time of the media timeline of the media content. If the corresponding SBD descriptor is included in the period element, the starting time of the SBD timeline can be the starting time of the period element. When the MPD type is determined to be dynamic, the DASH client can determine whether the SBD file include the starting time attribute. If the SBD file is determined to include the starting time attribute, the DASH client can determine the starting time of the SBD timeline based on the starting time attribute. Otherwise, if the SBD file is determined not to include the starting time attribute, the DASH client can determine the starting time of the SBD timeline based on the corresponding SBD descriptor. If the corresponding SBD descriptor is included in the MPD element, the starting time of the SBD timeline can be the value of the MPD availability starting time. If the corresponding SBD descriptor is included in the period element, the starting time of the SBD timeline can be the starting time of the period element.

In an embodiment, the DASH client can parse the SBD file, and build a timeline/orderline table. Then, the DASH client can build a query with an order of keys defined in the corresponding SBD descriptor and add the query to the request that the process (700) receives in step (S730).

Then, the process (700) proceeds to step (740). At step (S740), the process (700) sends one or more media segments to the DASH client based on the request. Then, the process (700) terminates.

VII. Computer System

The techniques described above, can be implemented as computer software using computer-readable instructions and physically stored in one or more computer-readable media. For example, FIG. 8 shows a computer system (800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
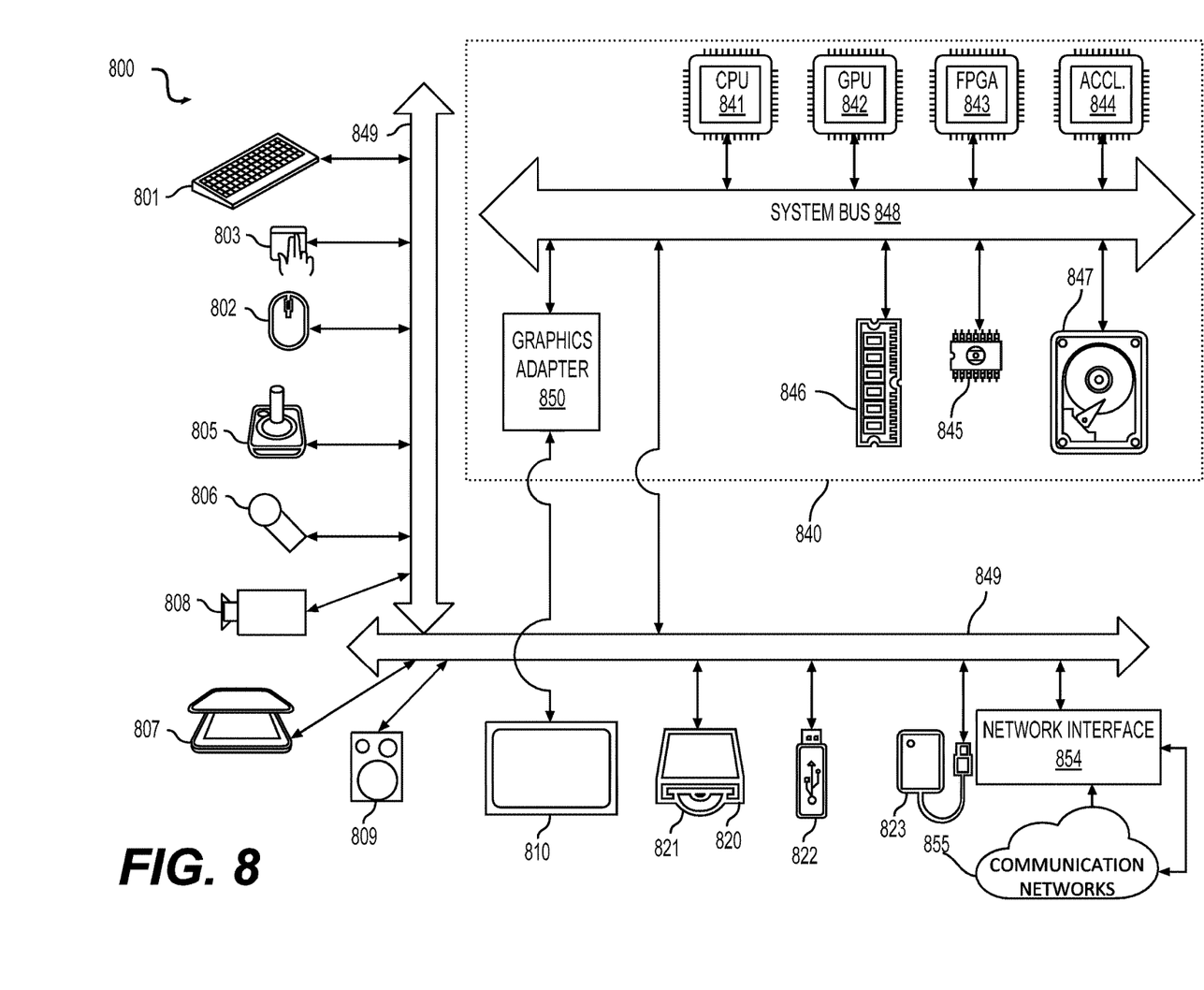
FIG. 8 is a schematic illustration of a computer system according to an embodiment of the disclosure.

The components shown in FIG. 8 for computer system (800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (800).

Computer system (800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove (not shown), joystick (805), microphone (806), scanner (807), and camera (808).

Computer system (800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data-glove (not shown), or joystick (805), but there can also be tactile feedback devices that do not serve as input devices), audio output devices (such as: speakers (809), headphones (not depicted)), visual output devices (such as screens (810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (810)) can be connected to a system bus (848) through a graphics adapter (850).

Computer system (800) can also include human accessible storage devices and their associated media such as optical media including CD/DVD ROM/RW (820) with CD/DVD or the like media (821), thumb-drive (822), removable hard drive or solid state drive (823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (800) can also include a network interface (854) to one or more communication networks (855). The one or more communication networks (855) can for example be wireless, wireline, optical. The one or more communication networks (855) can further be local, wide-area, metropolitan, vehicular and industrial, real-time, delay-tolerant, and so on. Examples of the one or more communication networks (855) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system (800)); others are commonly integrated into the core of the computer system (800) by attachment to a system bus as described below (for example Ethernet interface into a PC computer system or cellular network interface into a smartphone computer system). Using any of these networks, computer system (800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (840) of the computer system (800).

The core (840) can include one or more Central Processing Units (CPU) (841), Graphics Processing Units (GPU) (842), specialized programmable processing units in the form of Field Programmable Gate Areas (FPGA) (843), hardware accelerators for certain tasks (844), and so forth. These devices, along with Read-only memory (ROM) (845), Random-access memory (846), internal mass storage such as internal non-user accessible hard drives, SSDs, and the like (847), may be connected through the system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). Architectures for a peripheral bus include PCI, USB, and the like.

CPUs (841), GPUs (842), FPGAs (843), and accelerators (844) can execute certain instructions that, in combination, can make up the aforementioned computer code. That computer code can be stored in ROM (845) or RAM (846). Transitional data can be also be stored in RAM (846), whereas permanent data can be stored for example, in the internal mass storage (847). Fast storage and retrieve to any of the memory devices can be enabled through the use of cache memory, that can be closely associated with one or more CPU (841), GPU (842), mass storage (847), ROM (845), RAM (846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (800) and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various embodiments of the present disclosure can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition or as an alternative, the computer system can provide functionality as a result of logic hardwired or otherwise embodied in a circuit (for example: accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for receiving media data of media content, the method comprising:
receiving a media presentation description (MPD) file and a session-based description (SBD) file;
determining whether the SBD file includes a starting time attribute indicating a starting time of an SBD timeline of a session;
determining the starting time of the SBD timeline based on the SBD file in response to the SBD file including the starting time attribute; and
in response to the SBD file not including the starting time attribute,
determining the starting time of the SBD timeline based on a first attribute of a period element of the MPD file in response to a determination that an SBD descriptor corresponding to the SBD file is included in the period element at a period level of the MPD file.

2. The method of claim 1, further comprising:
in response to the SBD file not including the starting time attribute,
determining the starting time of the SBD timeline as a value of an availability starting time attribute of an MPD element in response to a type of the MPD file being dynamic and the SBD descriptor of the MPD file being included in the MPD element at an MPD level.

3. The method of claim 1, further comprising:
in response to the SBD file not including the starting time attribute,
determining the starting time of the SBD timeline as an initial starting time of a media timeline of the media content in response to a type of the MPD file being static and the SBD descriptor of the MPD file being included in an MPD element at an MPD level.

4. The method of claim 1, wherein the determining the starting time of the SBD timeline based on the first attribute of the period element of the MPD file further comprises:
determining the starting time of the SBD timeline as a value of a starting time attribute of the period element.

5. The method of claim 1, wherein the SBD file includes a duration attribute indicating a duration of the SBD timeline.

6. The method of claim 1, wherein the SBD file includes a loop attribute that indicates whether the SBD timeline is repeated.

7. The method of claim 1, wherein an orderline element of the SBD file includes an attribute indicating a starting segment from which the orderline element is applied.

8. The method of claim 7, wherein timing information of the starting segment is based on the starting time of the SBD timeline.

9. An apparatus for receiving media data of media content, the apparatus comprising:
processing circuitry configured to:
receive a media presentation description (MPD) file and a session-based description (SBD) file;
determine whether the SBD file includes a starting time attribute indicating a starting time of an SBD timeline of a session;
determine the starting time of the SBD timeline based on the SBD file in response to the SBD file including the starting time attribute; and
in response to the SBD file not including the starting time attribute,
determine the starting time of the SBD timeline based on a first attribute of a period element of the MPD file in response to a determination that an SBD descriptor corresponding to the SBD file is included in the period element at a period level of the MPD file.

10. The apparatus of claim 9, wherein the processing circuitry is further configured to:
in response to the SBD file not including the starting time attribute,
determine the starting time of the SBD timeline as a value of an availability starting time attribute of an MPD element in response to a type of the MPD file being dynamic and the SBD descriptor of the MPD file being included in the MPD element at an MPD level.

11. The apparatus of claim 9, wherein the processing circuitry is further configured to:
in response to the SBD file not including the starting time attribute,
determine the starting time of the SBD timeline as an initial starting time of a media timeline of the media content in response to a type of the MPD file being static and the SBD descriptor of the MPD file being included in an MPD element at an MPD level.

12. The apparatus of claim 9, wherein the processing circuitry is further configured to:
determine the starting time of the SBD timeline as a value of a starting time attribute of the period element in response to the determination that the SBD descriptor is included in the period element at the period level of the MPD file.

13. The apparatus of claim 9, wherein the SBD file includes a duration attribute indicating a duration of the SBD timeline.

14. The apparatus of claim 9, wherein the SBD file includes a loop attribute that indicates whether the SBD timeline is repeated.

15. The apparatus of claim 9, wherein an orderline element of the SBD file includes an attribute indicating a starting segment from which the orderline element is applied.

16. The apparatus of claim 15, wherein timing information of the starting segment is based on the starting time of the SBD timeline.

17. A non-transitory computer-readable storage medium storing instructions which, when executed by a computer for receiving media data of media content cause the computer to perform:
receiving a media presentation description (MPD) file and a session-based description (SBD) file;
determining whether the SBD file includes a starting time attribute indicating a starting time of an SBD timeline of a session;
determining the starting time of the SBD timeline based on the SBD file in response to the SBD file including the starting time attribute; and
in response to the SBD file not including the starting time attribute,
determining the starting time of the SBD timeline based on a first attribute of a period element of the MPD file in response to a determination that an SBD descriptor corresponding to the SBD file is included in the period element at a period level of the MPD file.

* * * * *